United States Patent
Kelly

(10) Patent No.: US 8,418,453 B2
(45) Date of Patent: Apr. 16, 2013

(54) FLOAT FOR SEA WAVE ENERGY CONVERSION PLANT

(75) Inventor: Hugh-Peter Granville Kelly, Westcliff on Sea (GB)

(73) Assignee: Trident Energy Ltd, Essex (GB)

( * ) Notice: Subject to any disclaimer, the term of this patent is extended or adjusted under 35 U.S.C. 154(b) by 902 days.

(21) Appl. No.: 12/083,258

(22) PCT Filed: Oct. 10, 2006

(86) PCT No.: PCT/GB2006/003769

§ 371 (c)(1),
(2), (4) Date: Jul. 28, 2009

(87) PCT Pub. No.: WO2007/042800

PCT Pub. Date: Apr. 19, 2007

(65) Prior Publication Data

US 2010/0132353 A1    Jun. 3, 2010

(30) Foreign Application Priority Data

Oct. 10, 2005 (GB) .................................. 0520571.1

(51) Int. Cl.
*F03B 13/18* (2006.01)
*F03B 13/10* (2006.01)
*H02P 9/04* (2006.01)

(52) U.S. Cl.
USPC .................... 60/497; 60/499; 290/42; 290/53

(58) Field of Classification Search ............ 60/495–507; 290/42, 53; 441/21, 22; 114/145 R, 145 A, 114/162, 170
See application file for complete search history.

(56) References Cited

U.S. PATENT DOCUMENTS

| | | | | | |
|---|---|---|---|---|---|
| 538,498 | A | * | 4/1895 | Breitenstein | 60/504 |
| 1,004,332 | A | * | 9/1911 | Allen | 60/507 |
| 1,471,222 | A | * | 10/1923 | Taylor | 60/496 |
| 1,485,574 | A | * | 3/1924 | Viora | 60/506 |
| 2,749,085 | A | * | 6/1956 | Searcy | 60/505 |
| 4,179,886 | A | * | 12/1979 | Tsubota | 60/398 |
| 4,208,876 | A | * | 6/1980 | Tsubota | 60/495 |

(Continued)

FOREIGN PATENT DOCUMENTS

GB    2 325 708 A    12/1998
WO    WO-88/00297 A    1/1988

(Continued)

OTHER PUBLICATIONS

Duckers, L. J., "Wave-Energy: Crests and Troughs," Renewable Energy, Pergamon Press, Oxford, GB. vol. 5, No. 5/8, Part 2. Aug. 1, 1994, pp. 1444-1452, XP000476640, ISSN: 0960-1481, the whole document.

*Primary Examiner* — Kenneth Bomberg
*Assistant Examiner* — Christopher Jetton
(74) *Attorney, Agent, or Firm* — Harness, Dickey & Pierce, P.L.C.

(57) ABSTRACT

A float for use in capturing energy from waves, said float comprising: a central body providing buoyancy, said float further comprising: a leading part which has a leading surface which, in use of the float, is inclined upwards from horizontal such that the top of said leading surface projects further from said central body than the bottom of said leading surface and/or a trailing part which, in use of said float, extends downwards from said central body and presents a trailing surface which is inclined downwards from horizontal such that the top of said trailing surface is closer to said body than the bottom of said trailing surface.

24 Claims, 5 Drawing Sheets

| U.S. PATENT DOCUMENTS | | | |
|---|---|---|---|
| 4,560,884 A * | 12/1985 | Whittecar | 290/42 |
| 4,748,808 A | 6/1988 | Hill | |
| 6,109,029 A | 8/2000 | Vowles et al. | |
| 6,389,810 B1 | 5/2002 | Nakomcic et al. | |
| 6,864,592 B1 | 3/2005 | Kelly et al. | |
| 2003/0019207 A1 | 1/2003 | Parker | |

| FOREIGN PATENT DOCUMENTS | | |
|---|---|---|
| WO | WO-98/39205 A | 9/1998 |
| WO | WO-00/39457 A | 7/2000 |
| WO | WO-01/06119 A | 1/2001 |
| WO | WO-02/059480 A | 8/2002 |

* cited by examiner

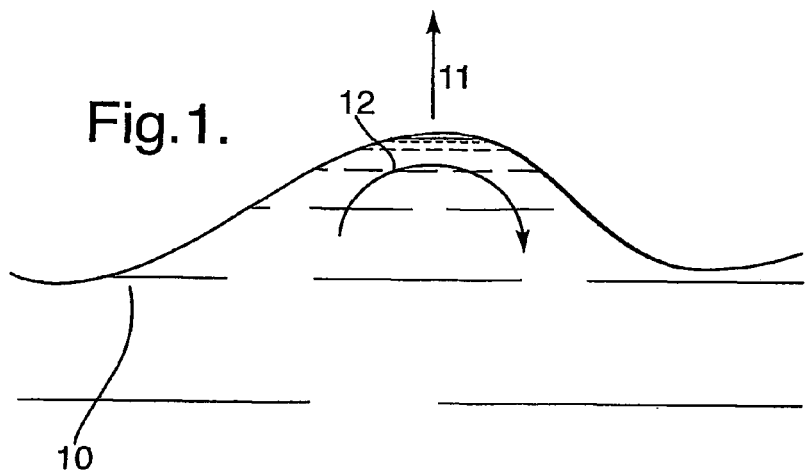
Fig.1.
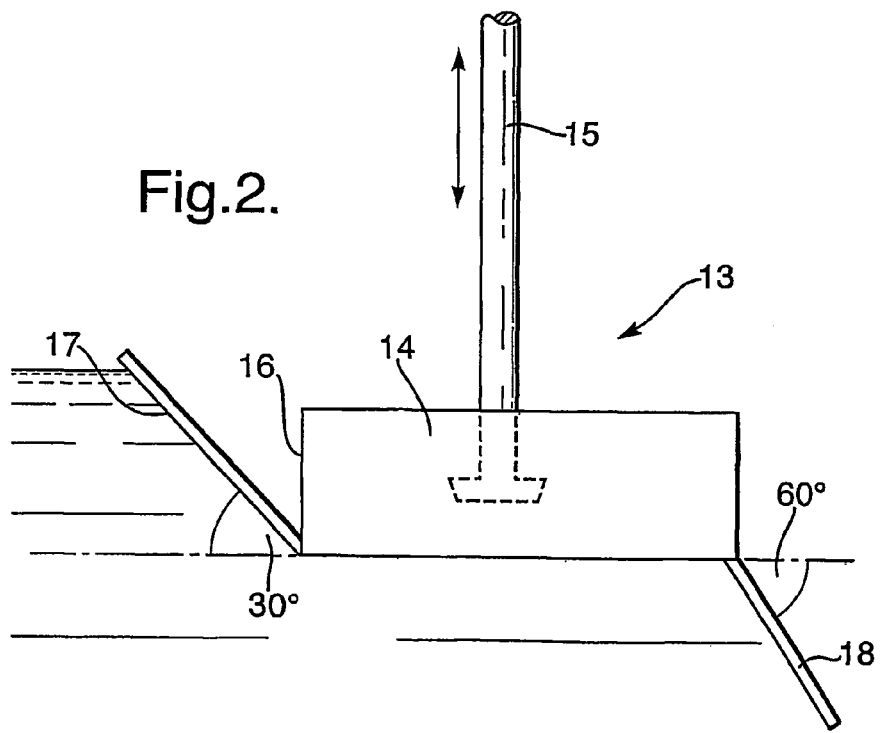
Fig.2.
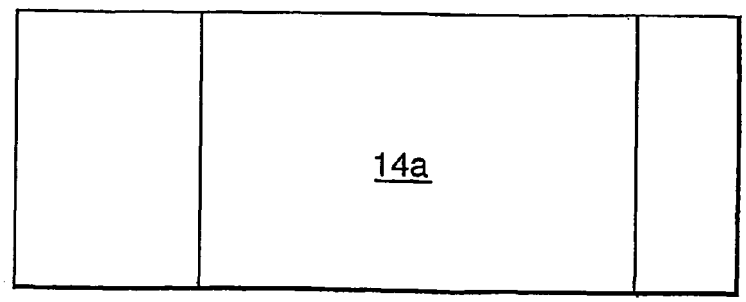

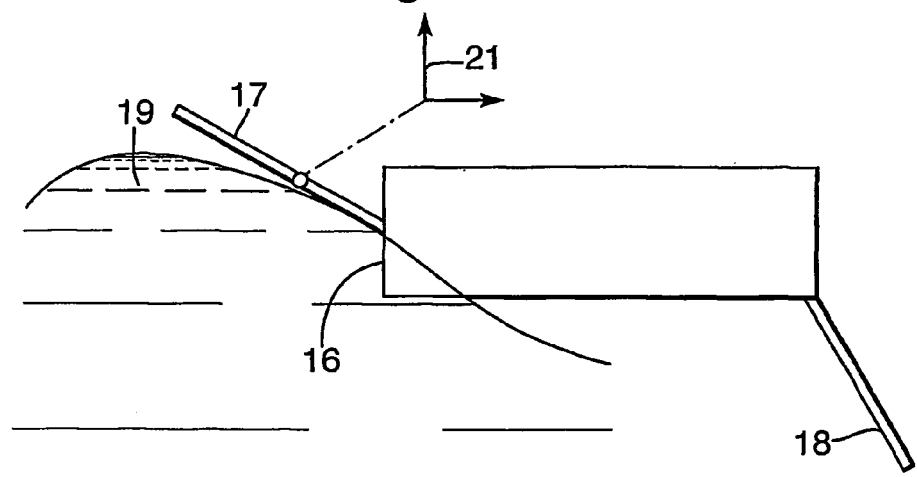
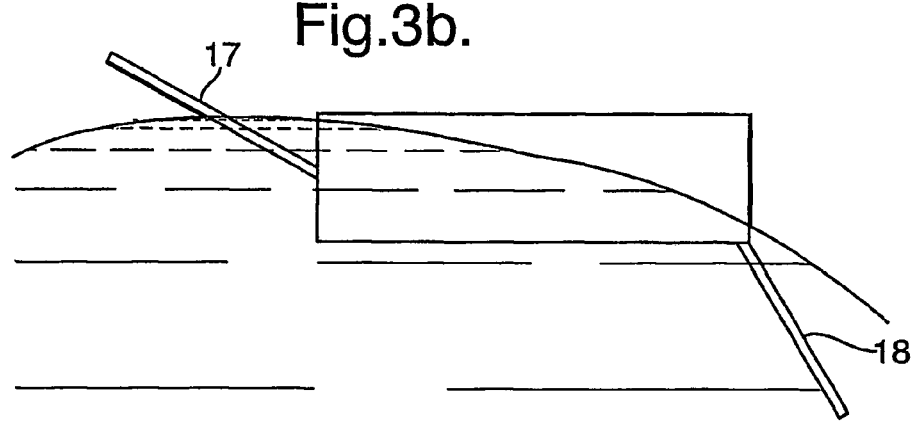
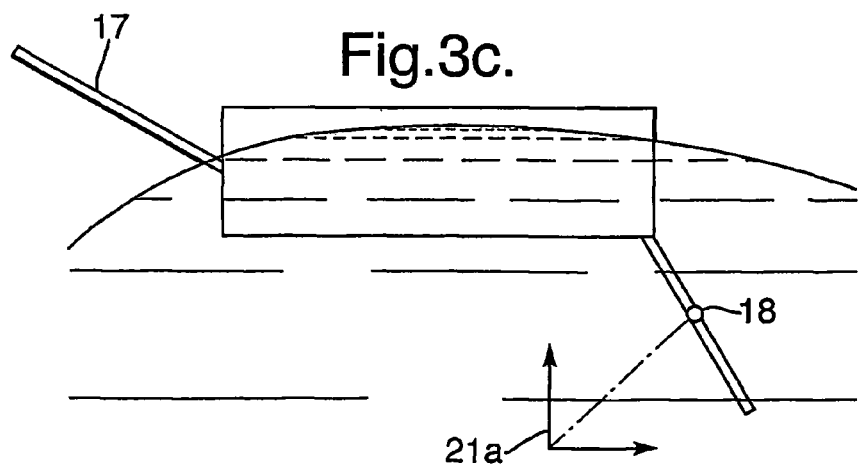

FLOAT FOR SEA WAVE ENERGY CONVERSION PLANT

CROSS-REFERENCE TO RELATED APPLICATIONS

This application is a 371 National Stage of International application No. PCT/GB2006/003769, filed Oct. 10, 2006 and published in English on Apr. 19, 2007. This application claims the benefit of UK Patent Application GB 0520571.1, filed Oct. 10, 2005. The disclosures of the above applications are incorporated herein by reference.

The following invention relates to floats for the capture of sea wave energy and improvements to the design thereof.

Sources of clean energy are becoming of increasing importance in order to reduce the current dependency on fossil fuels and their effect on climate change. At present, wind power is well established as such a source, but by far the greatest source of exploitable renewable energy is that of the seas. Many schemes for exploiting this source of energy are under investigation but their capital cost and the cost of the electricity generated by them remains considerable.

Certain types of conversion plants use floats or buoyant pontoons as their means for capturing sea-wave energy. The floats, placed in the sea, undulate with the waves. The mechanical energy captured by the floats is imparted to some form of mechanical to electrical energy conversion mechanism. It is self-apparent that the better the performance of the float in terms of capturing the available wave energy, the more the mechanical energy that can be imparted to the conversion mechanism. In turn this leads to an increased electrical output.

By way of background information to the invention disclosed herein, the energy component contained within a typical sea wave is now explained. This can be split into two principal components. These are known as heave and swell. The more familiar heave component is that responsible for lifting and lowering buoyant articles placed in the waves while the swell is the more hidden component, being that associated with the elliptical motion of water currents within the wave itself. (It is this latter component that makes the bather's body sway to and fro when standing on the seabed.) The available energy is divided about equally between heave and swell.

To date, accepted teaching states that the maximum energy that can theoretically be captured by a float is limited to the 50% component associated with the heave energy of the wave. Were it possible to capture at least some of the swell energy clearly the performance of the float would be enhanced.

The present invention provides a float for use in capturing energy from waves, said float comprising: a central body providing buoyancy, said float further comprising: a leading part which has a leading surface which, in use of the float, is inclined upwards from horizontal such that the top of said leading surface projects further from said central body than the bottom of said leading surface and/or a trailing part which, in use of said float, extends downwards from said central body and presents a trailing surface which is inclined downwards from horizontal such that the top of said trailing surface is, in the horizontal direction, closer to said body than the bottom of said trailing surface.

According to the invention, a float for use in sea waves for capturing the energy thereof comprises as a first part, a central body portion having a buoyancy sufficient a) both to support its own weight and that of any vertical weight acting upon it of an energy conversion system driven thereby and b) to provide driving force to the energy conversion system, and as a second part a frontal extension to the said body in the form of an upwardly inclined surface (facing and engaging the oncoming waves) and as a third part, a rearward extension being in the form of a downwardly inclined surface. (For engaging the motion of the waves below and towards the rear of the float.) In use, the second part engages the oncoming wave to augment lift, and the third part engages the motion of the waves below and towards the rear of the float, in similar fashion, to augment the lift provided thereby.

Preferably the frontal extension is in the form of a fin attached to or integral to the body of the float so forming the upwardly inclined surface and the rearward extension is a similar fin so forming the downwardly inclined surface.

Preferably, the front fin is positioned in height relative to the central body of the float taking into account the local prevailing wave conditions in which the float is to operate, such as to optimise the energy capture for the said conditions. In one example, pertaining to one particular type or profile of sea wave, the positioning of the fin may be such that in calm conditions all or substantially all of the operative surface of the fin is above water level. In another example, pertaining to another sea wave type or profile the fin may extend from the central body starting at its lowest level. The rearward fin is preferably positioned so as to depend downwards from the rear underside of the float.

The method of operation of the float is as follows. The central body portion of the float, on account of its buoyancy, serves in well-known manner to capture the heave component of energy in the wave acting upon it. Thus the float attempts to rise with the rising body of water acting upon it. The mass of water comprising the advancing front slope of the wave acts constructively against the sloped underside of the front fin. A vertical component of thrust results, so augmenting the thrust present from the float's natural buoyancy. The under swell of the wave is unable to slip unimpeded past the underside of the float on account of the presence of the rearward extension. This results in a further upwards component of thrust, in this case again due to the swell component. The measured effect of combining the frontal extension and the rearward extension can increase the vertically acting thrust imparted by the float by up to 50%, even 70%, over that which would arise from the buoyancy of the float alone.

Experimentation has shown that the ideal angles of the front and rearwards surfaces for energy capture depend to some extent on wave frequency. In practice however, the optimum angles—depending from the horizontal—for the front surface have been found to lie between 10 to 50°, preferably 20-40°, and for the rearward surface, between 50 to 85°, preferably 60 to 80°.

It will be appreciated that as a result of the front portion of the wave striking the underside of the front fin, some degree of torque will be imparted to the body of the float, manifested in a tendency of the front edge of the float to attempt to rise relative to its centre. Similarly some degree of torque will also be experienced resulting from the action of the waves acting upon the rearward extension. In this case, the torque will be in the opposite sense.

In a preferred embodiment of the invention, the length of the float, by which is meant its dimension in the direction of travel of the wave, is so selected in combination with the respective surface areas and angles of the frontal and rearward fins, that the overall torque acting upon the float is kept to a minimum.

In a further preferred embodiment the front and rearward fins and the central body portion of the float are manufactured from a single piece construction such as maybe obtained from a single part mould or the like.

The forces that can be imparted by sea waves in strong weather can be formidable. In a preferred form of construction of the float, an internal reinforcing member is embodied within the float extending up and into the frontal extension and similarly down and into the rear extension. The member may be rigidly attached to a pole extending vertically into the float for communicating the upwards thrust experienced by it to an energy conversion mechanism mounted above or below the float.

It will be appreciated that during the installation of a wave energy conversion farm, careful consideration will be given to the prevailing direction of the oncoming waves. This, as is self evident, is to ensure the optimum reaction force is obtained between the advancing waves and the floats on which they are acting. Specifically, in the case of the float as disclosed herein, this orientation is to ensure that the wave reacts to the maximum effect against the front and rearwards surfaces. Clearly, in this case, were the waves to advance from the side, there would be no contribution to the upwards thrust by the surfaces.

Although there are locations in the oceans where the prevailing direction of the waves is consistent, this is rarely the case, a variation of ±30° from the norm being typical.

According to a feature of the invention, swivel means are provided enabling the float to turn into the prevailing direction of the waves. Such means may comprise a ball race arrangement incorporated within the body of the float enabling it to swivel relative to the pole conveying its thrust to the energy conversion means, or the swivel means may be provided within the pole itself of the energy conversion mechanism. In any of these cases, experimentation has shown that the float turns nicely into the prevailing wave direction so self optimising energy capture and conversion.

Mechanical damping means may be built into the swivel mechanism to overcome any over-lively response.

A disadvantage of flat front faced floats is the substantial lateral pressure exerted upon them by the advancing waves. This pressure can be destructive and cause substantial bending moments on the pole to which it is attached.

According to a further feature of the invention, the front face of the float is contoured in such manner as to reduce the pressure of waves acting upon it, but not to the material detriment of that portion of wave acting against the upwardly inclined front surface of the float to increase lift. The contouring is also arranged such as to assist the through flow under the float of the portion of wave not significantly contributing to the upwards lift of the front surface. This latter portion is thereby directed to the rearward downwardly inclined surface, so enhancing the lift provided thereby. In practice a compromise must be sought between reducing the lateral thrust upon the flat and any consequent material reducing effect upon the lift; the very operation of the front and rear surfaces of the float is dependant to a degree upon the staffing of the advancing wavefront.

The invention will now be described with reference to the accompanying drawings in which:—

FIG. 1 shows the principal energy components contained within a sea wave

FIG. 2 shows a float of the invention

FIGS. 3a-3c show the action of the waves acting upon various surfaces of the float

Figure 4:
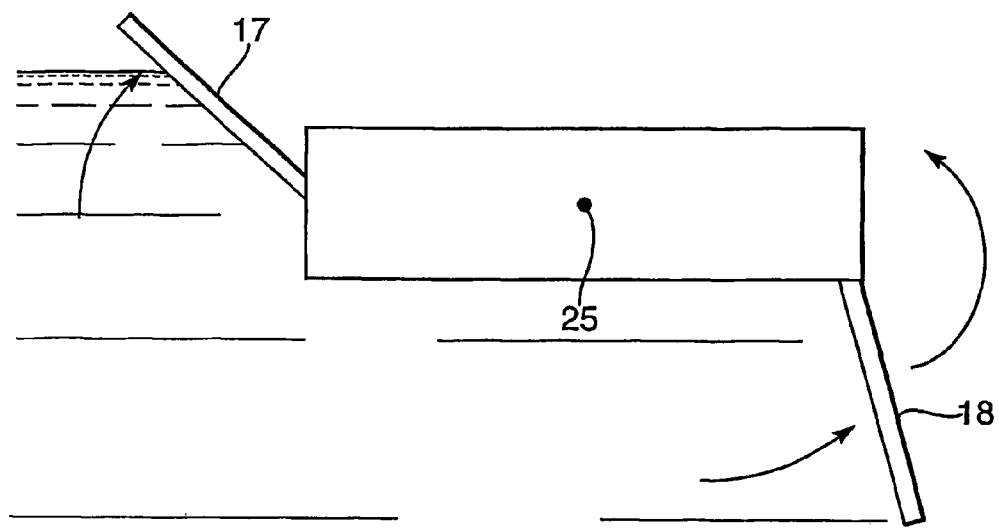
FIG. 4 shows torque forces acting upon the frontal and rearward float extensions and FIG. 5 shows the float incorporating an internal reinforcement member.

Referring to FIG. 1, a sea wave is shown travelling across the page from left to right at 10. The heave component of the wave, being that responsible for lifting a buoyant object placed therein, is shown by the vector arrow at 11. The hidden swell component is shown by the arrow 12. The stored mechanical energy within the wave is divided approximately 50/50 between the two components.

The buoyant force available from a wave is commonly understood as that responsible for the rise and fall of buoyant objects placed upon it. The energy available from the swell force is best understood When considering the mechanical reaction of a wave against an immovable object in its path. The forces are considerable and account for the damage over a long term to sea beaches, breakwaters and the like.

FIG. 2 shows at 13 a side view of the float of the invention. The float comprises a central body portion 14, which viewed in plan as shown at 14a is of orthogonal cross-section. The body may be formed from a suitable expanded foam or the like, encased within a fibreglass housing. The float is attached to a pole 15 used to drive an energy conversion mechanism situated above or below the float. The pole is guided by rollers (not shown), thereby constraining the float to a purely vertical motion.

Protruding from the front surface 16 of the float i.e. that surface facing the oncoming waves is an inclined frontal extension fin 17. It will be noted the fin extends from the front surface at a point close to the bottom of the float, which is generally the optimum position for energy capture. Protruding downwards from the rear of the float is a further inclined rearward extension fin 18. The exact optimum point, at which this fin extends from the float as well as its surface area, is determined according to the predominant characteristics of the wave in which the float is to operate. Typical angles from the horizontal are up +30 for the front fin and down 60° for the rear fin. The action of the float is now explained with reference to FIG. 3.

Consider the singular case of an oncoming wave acting upon the float. FIG. 3a shows the frontal slope 19 of the wave impacting upon the front surface 16 of the float and the upwardly inclined fin 17. The fin traps this front resulting in an upwards component of thrust from this action as shown in the vector diagram at 21. As the main portion of the wave surrounds the float as shown in FIG. 3b, the natural buoyancy of the float causes it to rise, ensuring that the advancing front continues to be trapped by the fin 17. This ensures that as much component of vertical thrust as is possible is extracted from the said front portion of the wave.

The float continues to rise, afforded vertical thrust from its buoyancy as shown at FIG. 3b and by now is substantially surrounded by water. The internal swell component of the wave (as shown in FIG. 1 at 12) is however unable to swish past the underside of the float owing to the blocking action afforded by the downwardly sloping fin 18. This results in an upward component of thrust acting upon the underside of the float as shown by the vector diagram, 21a. (Note, there is a similar downward component of thrust acting upon the body of water underneath the swell.)

In consequence the float enjoys additional lifting forces resulting from both the front and rearward extensions, so contributing substantially to the overall force available to drive an energy conversion system mechanically connected thereto. This effect is certainly due to the presence of the fins as confirmed by early experiments where plane surfaces were used having virtually zero buoyancy.

It has been found that the upwards thrust may be improved by as much as 50% even 70%, therefore increasing by a substantial margin the thrust that would be available from a plain float having approximately the same displacement.

It is evident from the vector diagrams shown in FIGS. 3a-3c that torque Forces will occur attempting to turn the body of the float around an imaginary central line, 25. However, as can be seen, each of the torque forces acts in opposite senses, the front torque force attempting to turn the float in a clockwise direction and the rear force attempting to turn the float in an anti-clockwise direction. By judicious choice of the surface areas of the fins 17 and 18, and their angles relative to the central body of the float, these torques can be arranged substantially to counterbalance one another.

Figure 5:
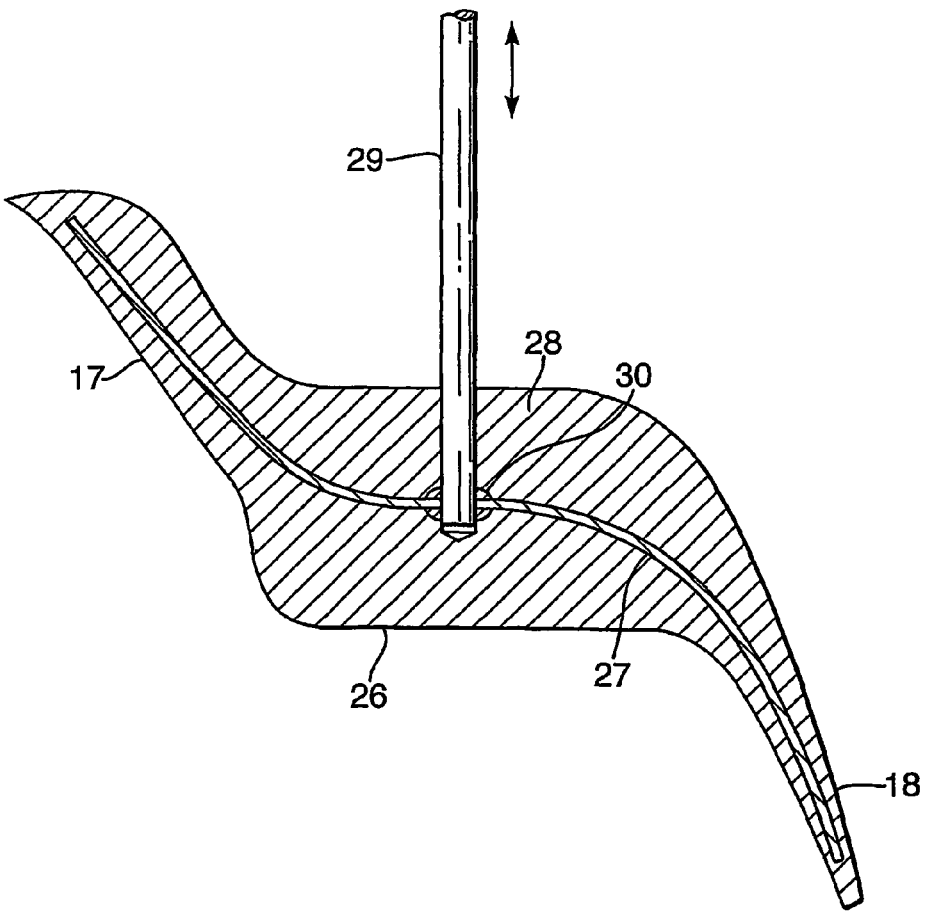

A key issue affecting the viability of any wave energy converter using floats is their ability to survive. Referring to FIG. 5, a float of the invention is shown at 26 in which an internal reinforcing member 27 is embodied. This can be made from carbon fibre materials or even steel plate. The member extends, as shown, upwardly into the frontal fin 17 through the central body 28 and down into the rearwards fin 18. A pole 29 communicating thrust from the float to a wave energy conversion mechanism mounted above or below the float is rigidly attached to the reinforcing member as shown at 30. By this means the reinforcing member serves not only to hold rigid the structure of the float but also assists in imparting the upward thrust experienced thereby to the pole 29.

Figure 6:
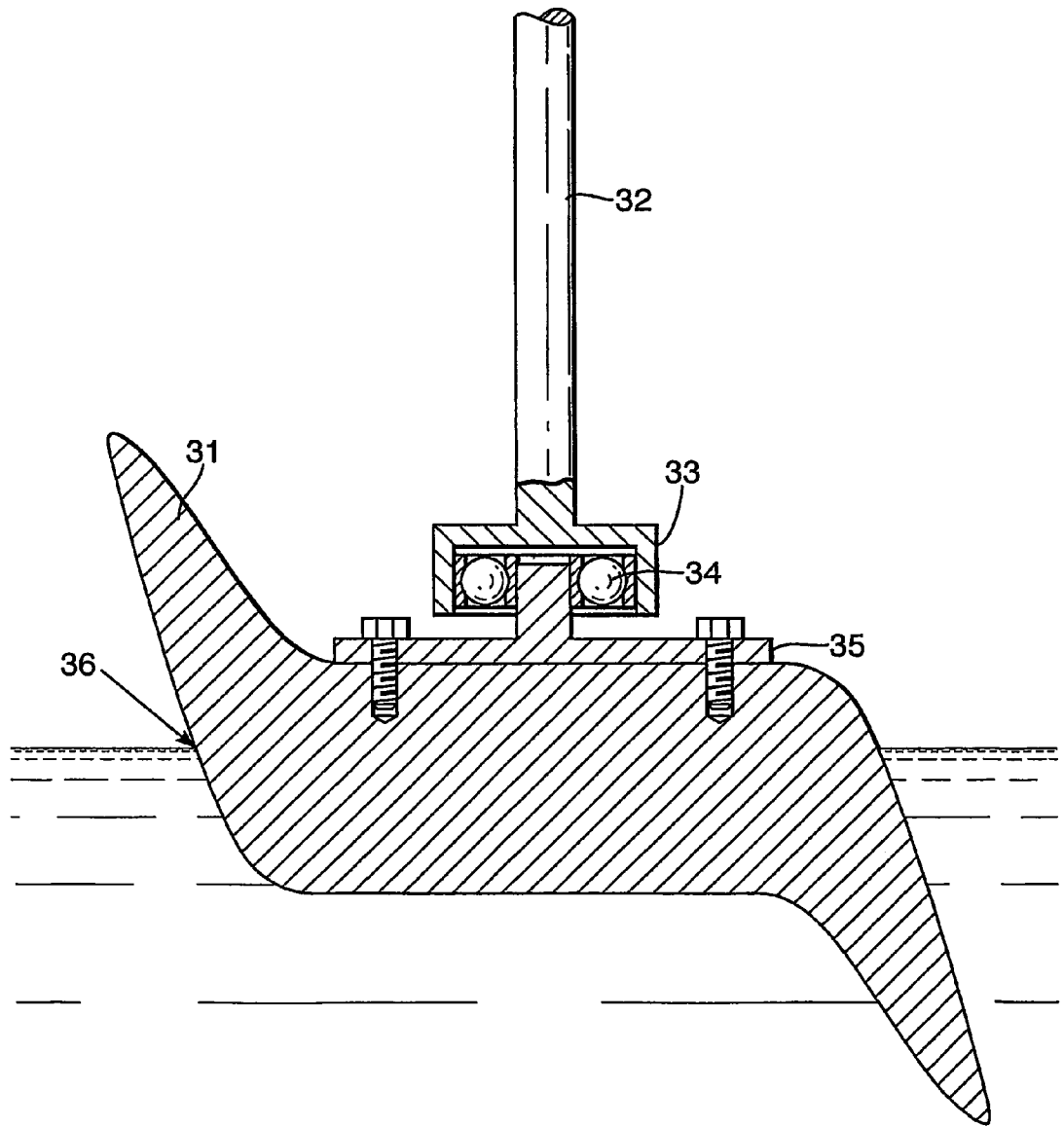
FIG. 6 shows a float incorporating swivel means

Referring to FIG. 6, a float 31 of the invention is shown attached to a thrust pole 32 by a boss 33. Within the boss is located a bearing journal 34, the inner portion of which is affixed by a rigid member 35 to the body of the float, and the outer portion to the boss 33. The operation of the arrangement is as follows. In the event of a sequence of waves arriving off the centre line 36 of the float, the reaction of the waves against the upwardly and downwardly inclined surfaces is such as to cause the float to swivel and turn squarely into the direction of the prevailing waves. By this means, the optimal reaction of the waves against the surfaces is maintained. Damping means, not shown, may be incorporated within the swivel mechanism to limit the rate of response of the float and thereby minimize mechanical wear and vibration. The swivel point need not be incorporated within the boss itself, as shown, but rather be built into the pole itself, or the energy conversion mechanism.

Figure 7:
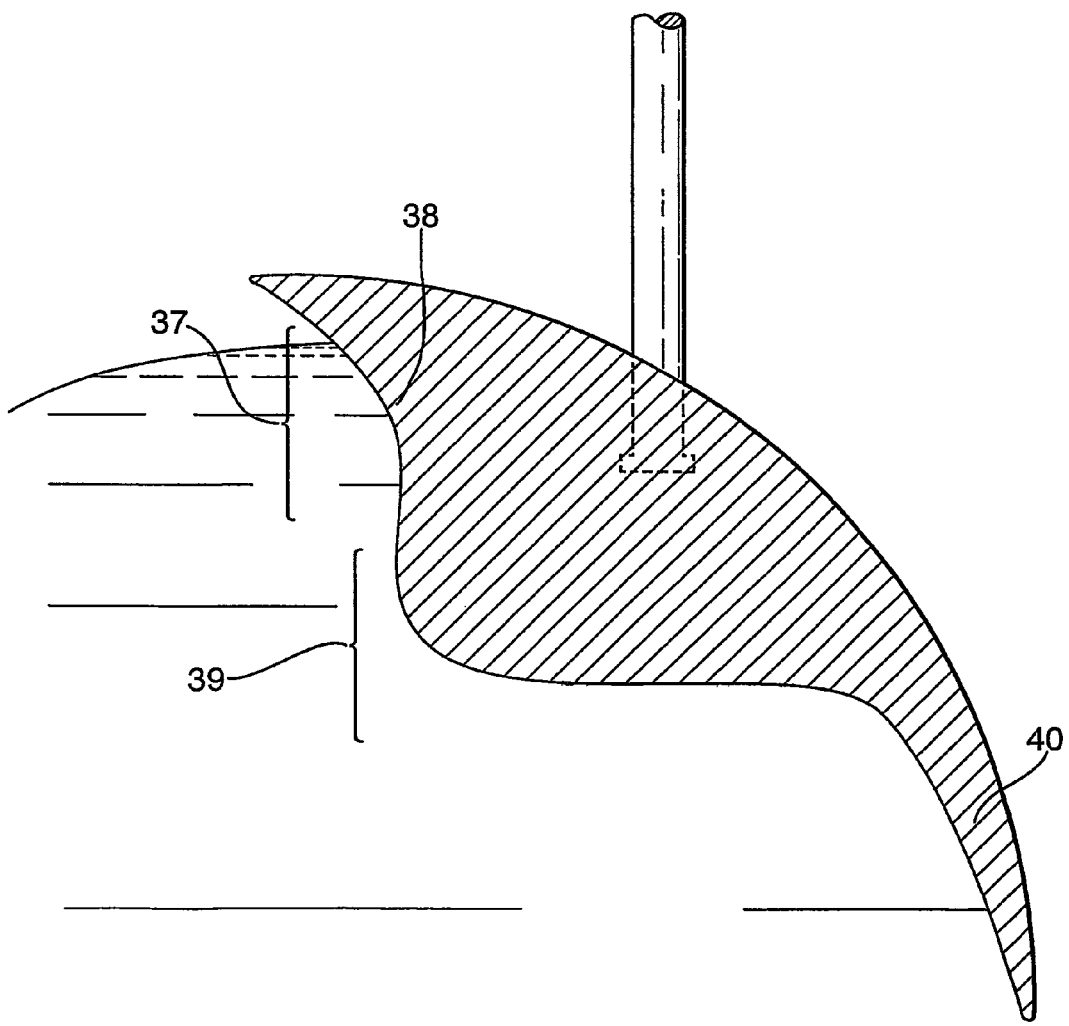
FIG. 7 shows a float designed to reduce frontal wave impact forces.

A method of reducing the frontal pressure of waves against the float is now shown with reference to FIG. 7. It is commonly known that the impact pressure of waves upon objects placed in the sea can be colossal. The float, as shown in FIG. 7, is contoured as in such manner as to split the wave into two components, an upper one 37 for reacting against the front surface 38 and a lower one 39 for reacting against the lower surface 40. The effect of the contour is such as to allow the ready passage of the lower component of wave under the float, and thereby minimize the destructive crashing effect of the wave against a purely flat surface. However, the energy of this component, because it has not been dissipated against the front surface, is advantageously put to use in reacting against the lower surface. Careful choice of the contour ensures overall less impact force upon the float, but without compromising to a material extent, the overall lift experienced thereby.

The contour, in terms of the slope and start position of the front surface relative to the main body, and similarly for the rear surface, may be pre-selected according to the local wave conditions to optimise the energy capture.

Numerous variations will be apparent to those skilled in the art.

The invention claimed is:

1. A float for use in capturing energy from waves, said float comprising:
    a central body providing buoyancy, said float further comprising:
    a leading part which has a leading surface which, in use of the float, is inclined upwards from horizontal such that the top of said leading surface projects further from said central body than the bottom of said leading surface; and
    a trailing part which, in use of said float, extends downwards from said central body and presents a trailing surface which is inclined downwards from horizontal such that the top of said trailing surface is, in the horizontal direction, closer to said body than the bottom of said trailing surface,
    wherein said top of said leading edge extends above atop of said central body,
    wherein said top of said trailing surface is below the bottom of said central body.

2. The float of claim 1, wherein said leading surface is inclined at an average angle of between 10 and 50° up from the horizontal.

3. The float of claim 1, wherein said trailing surface is inclined between 50 and 85° down from the horizontal.

4. The float of claim 1, wherein said leading surface is formed integrally as part of said central body.

5. The float of claim 1, wherein said leading part is formed by a projection extending from said body and attached to said body at said bottom of said leading surface.

6. The float of claim 1, wherein said trailing part is formed integrally with said central body.

7. The float of claim 1, an internal reinforcing member within the central body and extending in said leading part and/or in said trailing part.

8. The float of claim 7, wherein said reinforcing member is integral with or directly fixed to an attachment means of said central body for the attachment thereto of a member for transferring up/down movement of said float to a component of an energy conversion system.

9. The float of claim 1, wherein said leading surface is curved such that no flat surface is presented to an oncoming wave whose wavefront is perpendicular to a horizontal axis of symmetry of said float.

10. The float of claim 1, wherein said leading surface extends from midway or lower down said central body and/or said trailing surface extends substantially from a bottom of said central body, preferably from the bottom of said central body.

11. The float of claim 1, wherein the distance of the float from the bottom of the leading edge to the top of the trailing edge, the lengths of the leading and trailing surfaces, the widths of the central body, leading and trailing surfaces and the angles of inclination of the leading and trailing surfaces from the horizontal are such that on passing of a typical wave the moments of force around an attachment position of said central body acting on the leading and trailing surfaces are substantially opposite in direction and of a magnitude within 25% of each other.

12. The float of claim 1, wherein the ratio of the horizontal length of the leading surface to the horizontal length of the float in the direction of travel of the wave acting upon it is approximately one half.

13. The float of claim 1, wherein the ratio of the horizontal length of the trailing surface to the horizontal length of the float in the direction of travel of the wave acting upon it is approximately one third.

14. A method of generating energy from waves, said method comprising placing the float of claim 1 in waves and using a transducer to convert movement of said floats to electricity.

15. The method of claim 14, wherein said transducer is one or more linear generators.

16. A float for use in capturing energy from waves, said float comprising:
   a central body providing buoyancy, said float further comprising:
   a leading part which has a leading surface which, in use of the float, is inclined upwards from horizontal such that the top of said leading surface projects further from said central body than the bottom of said leading surface; and
   a trailing part which, in use of said float, extends downwards from said central body and presents a trailing surface which is inclined downwards from horizontal such that the top of said trailing surface is, in the horizontal direction, closer to said body than the bottom of said trailing surface,
   wherein said float has an attachment means for the attachment thereto of a member for transferring up/down movement of said float to a component of an energy conversion system,
   wherein said top of said trailing surface is below the bottom of said central body.

17. The float of claim 16, wherein said attachment means includes an arrangement whereby said float is rotatable about said member thereby to allow passive self aligning of said float to oncoming waves.

18. The float of claim 17, wherein said attachment means comprises a damper to damp rotation of said float relative to said member.

19. A float for use in capturing energy from waves, said float comprising:
   a central body providing buoyancy, said float further comprising:
   a leading part which has a leading surface which, in use of the float, is inclined upwards from horizontal such that the top of said leading surface projects further from said central body than the bottom of said leading surface; and
   a trailing part which, in use of said float, extends downwards from said central body and presents a trailing surface which is inclined downwards from horizontal such that the top of said trailing surface is, in the horizontal direction, closer to said body than the bottom of said trailing surface,
   wherein a member is attached at one end to said float for transferring up/down movement of said float to a component of an energy conversion system,
   wherein said top of said trailing surface is below the bottom of said central body.

20. The float and member of claim 19, wherein said float and member are rotationally attached thereby to allow passive alignment of said float to oncoming waves.

21. The float and member of claim 19, wherein said member includes rotatable means for allowing rotation of a part to which said float is attached relative to another part thereby to allow passive alignment of said float to oncoming waves.

22. A float and member of claim 19 and an energy conversion means for converting said transferred up/down movement of said member into electricity.

23. The float, member and energy conversion means of claim 22, wherein said member is rotatable relative to said energy conversion means.

24. The float and member of claim 20, further comprising a damper to damp said rotation.

* * * * *